US012574488B1

(12) United States Patent
El Dokor et al.

(10) Patent No.:  US 12,574,488 B1
(45) **Date of Patent:      \*Mar. 10, 2026**

(54) RESIDUAL ERROR MITIGATION IN MULTIVIEW CALIBRATION

(71) Applicant: Edge 3 Technologies, Inc., Phoenix, AZ (US)

(72) Inventors: Tarek El Dokor, Phoenix, AZ (US); Jordan Cluster, Tempe, AZ (US); Joshua King, Mesa, AZ (US); James Holmes, Mesa, AZ (US); Milind Subhash Gide, Phoenix, AZ (US)

(73) Assignee: Edge 3 Technologies, Phoenix, AZ (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/630,975

(22) Filed: Apr. 9, 2024

Related U.S. Application Data

(63) Continuation of application No. 17/562,069, filed on Dec. 27, 2021, now Pat. No. 11,985,292, which is a (Continued)

(51) Int. Cl.
    *G06K 9/00*       (2022.01)
    *G06T 7/593*     (2017.01)
    (Continued)

(52) U.S. Cl.
    CPC ........... *H04N 13/246* (2018.05); *G06T 7/593* (2017.01); *G06T 7/85* (2017.01); *G06T 2207/10012* (2013.01)

(58) Field of Classification Search
    CPC ......... H04N 13/246; G06T 7/85; G06T 7/593; G06T 2207/10012
    (Continued)

(56) References Cited

U.S. PATENT DOCUMENTS 5,559,695 A \*  9/1996  Daily ..................... G01S 11/12
                           701/1
10,275,898 B1 \*  4/2019  Song ................... H04N 13/243
    (Continued)

*Primary Examiner* — Marceau Milord
(74) *Attorney, Agent, or Firm* — Gordon Kessler

(57) ABSTRACT

Multiview calibration is essential for accurate three-dimensional computation. However, multiview calibration cannot be accurate enough because of the tolerances required in some of the intrinsic and extrinsic parameters that are associated with the calibration process, along with fundamental imperfections that are associated with the manufacturing and assembly process itself. As a result, residual error in calibration is left over, with no known methods to mitigate such errors. Residual error mitigation of the invention may be performed inline with a given calibration approach, or as a secondary processing step. Residual error mitigation aims at modifying the original parameters that have been estimated during an initial calibration process. These new, modified parameters are then used for triangulation and depth estimation of scene information. This approach also resolves parameter tolerances that are either too cumbersome to measure, or otherwise impossible to measure for practical stereo and multiview camera production and calibration applications.

15 Claims, 15 Drawing Sheets

Residual bias mitigation flowchart with single calibration target

Related U.S. Application Data continuation of application No. 16/882,702, filed on May 25, 2020, now Pat. No. 11,212,511, which is a continuation of application No. 16/038,225, filed on Jul. 18, 2018, now Pat. No. 10,666,926.

(60) Provisional application No. 62/577,695, filed on Oct. 26, 2017, provisional application No. 62/534,175, filed on Jul. 18, 2017.

(51) Int. Cl.
  *G06T 7/80* (2017.01)
  *H04N 13/246* (2018.01)

(58) Field of Classification Search
  USPC ........................................................ 382/154
  See application file for complete search history.

(56) References Cited

U.S. PATENT DOCUMENTS

| | | | | |
|---|---|---|---|---|
| 10,292,142 | B2 * | 5/2019 | Vutukuri | H04W 36/0066 |
| 10,341,632 | B2 * | 7/2019 | Pang | H04N 13/161 |
| 10,412,369 | B2 * | 9/2019 | Aurongzeb | H04N 13/15 |
| 10,412,373 | B2 * | 9/2019 | Pitts | H04N 13/275 |
| 10,666,926 | B1 * | 5/2020 | El Dokor | H04N 13/239 |
| 11,212,511 | B1 * | 12/2021 | El Dokor | H04N 13/271 |
| 11,699,247 | B2 * | 7/2023 | Ye | G06T 7/85 |
| | | | | 348/86 |
| 11,985,292 | B1 * | 5/2024 | El Dokor | H04N 13/239 |
| 2016/0227193 | A1 * | 8/2016 | Osterwood | G01S 17/42 |
| 2017/0188015 | A1 * | 6/2017 | Heidemann | H04N 13/239 |
| 2020/0027243 | A1 * | 1/2020 | Ziegler | H04N 13/246 |

* cited by examiner

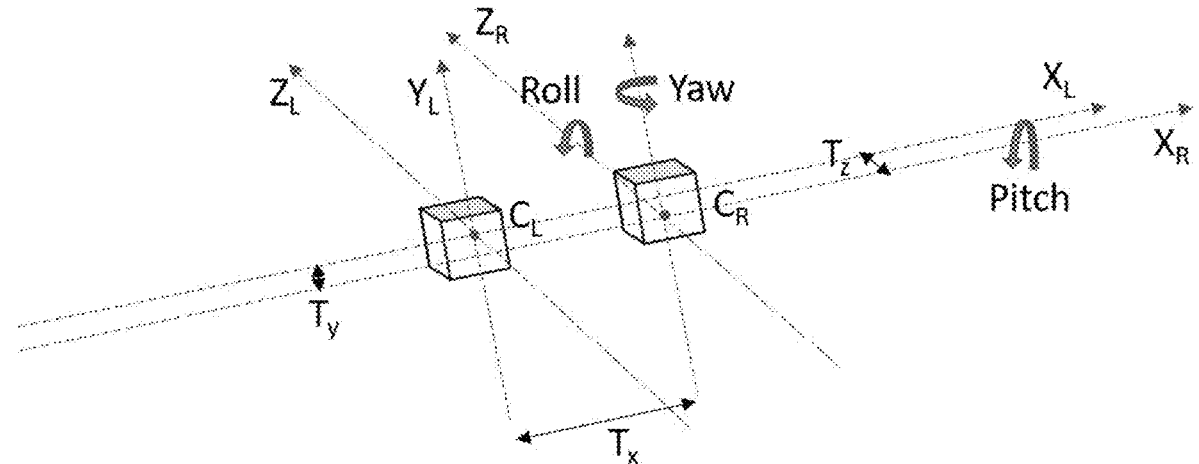
Figure 1: Rotation and translation parameters
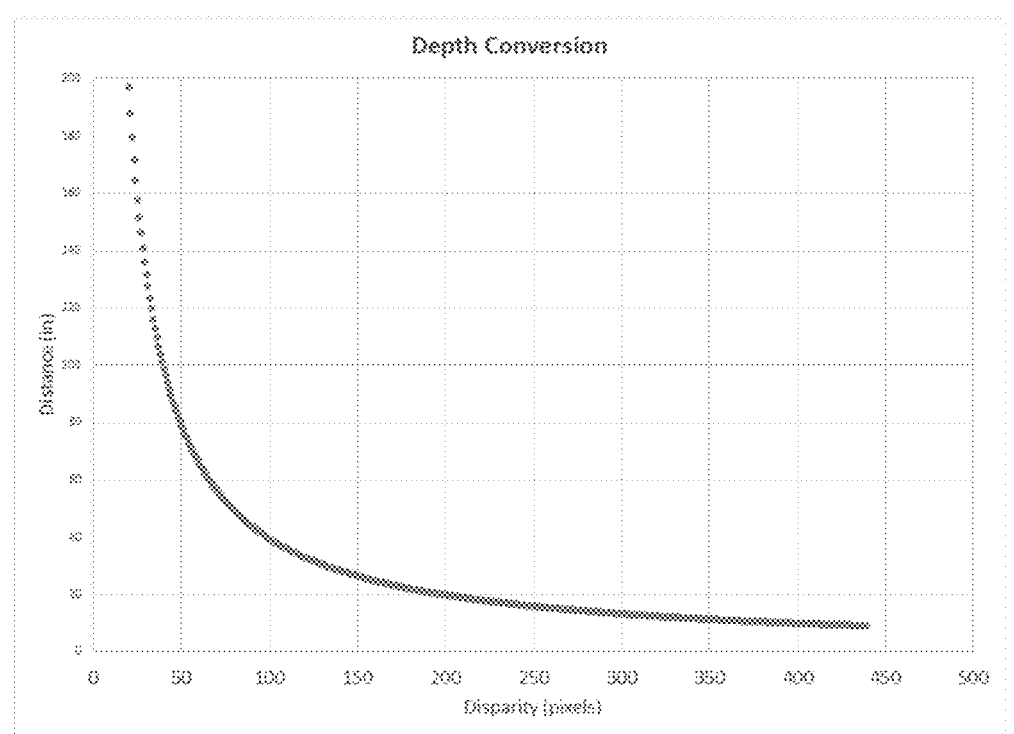
Figure 2: Example depth curve of a stereo camera

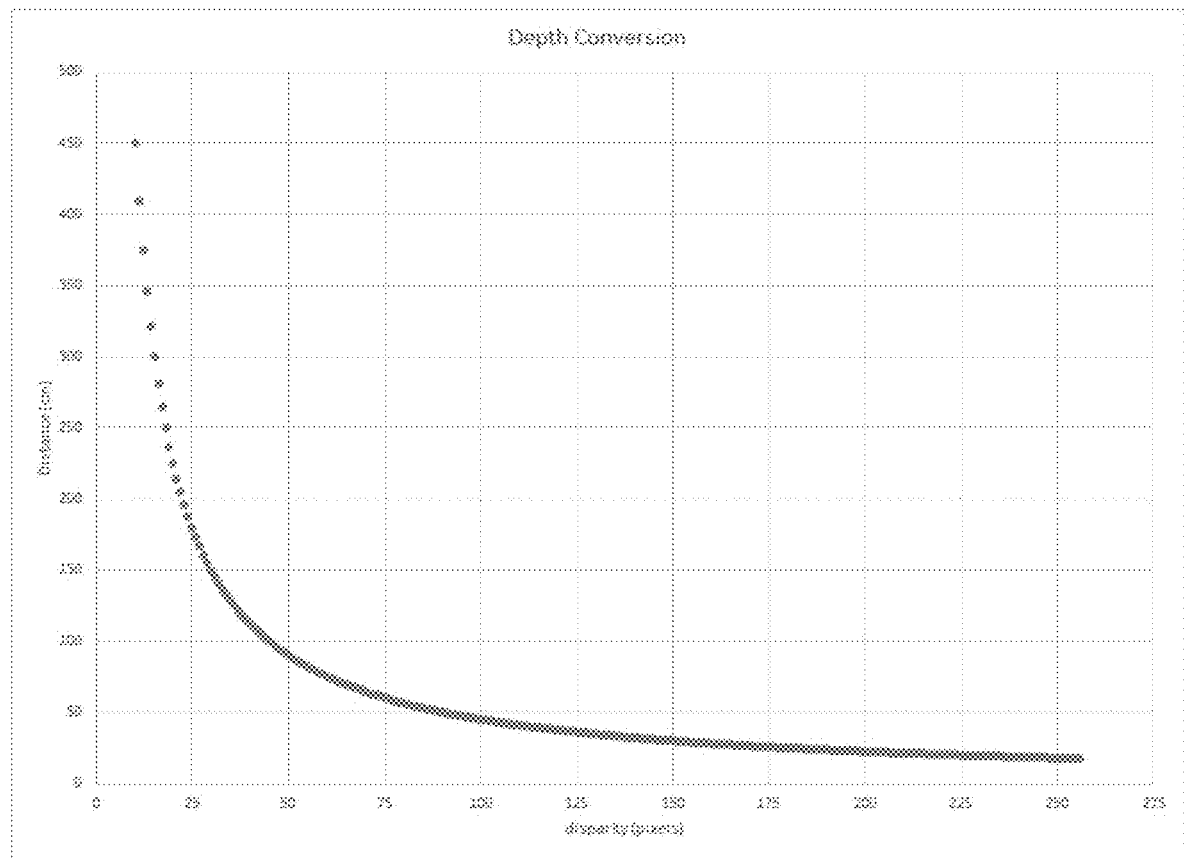
Figure 3: Example Depth curve with 6cm baseline and 6 micron pixel

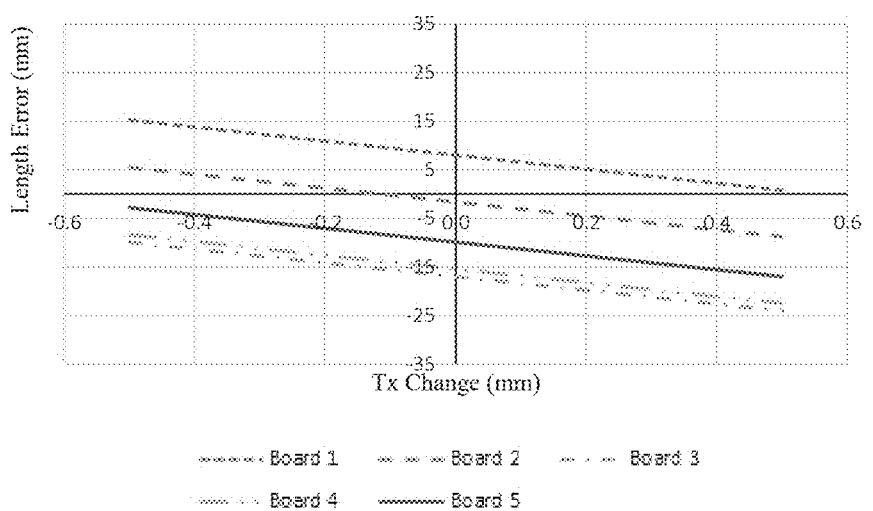
Figure 4: Example X translation parameter sensitivity
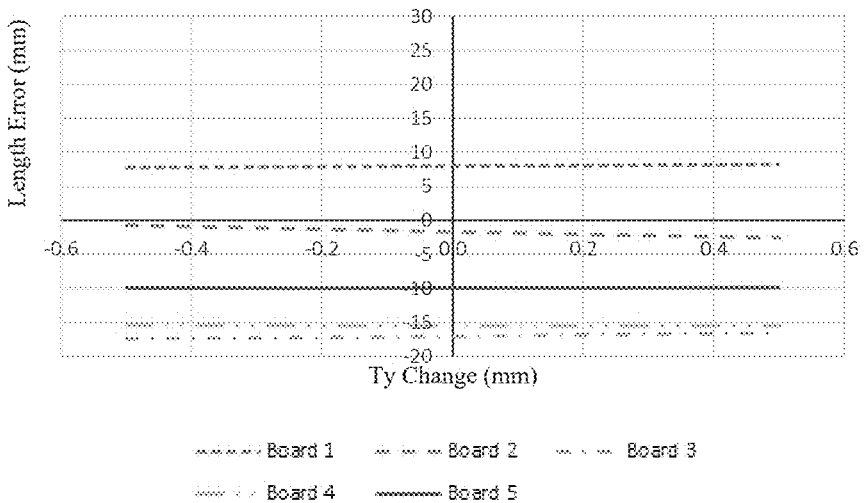
Figure 5: Example Y translation parameter sensitivity

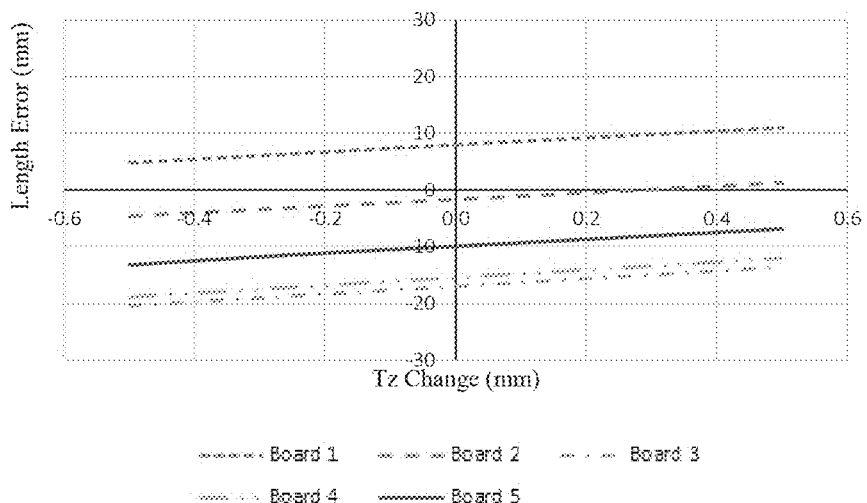
Figure 6: Example Z translation parameter sensitivity
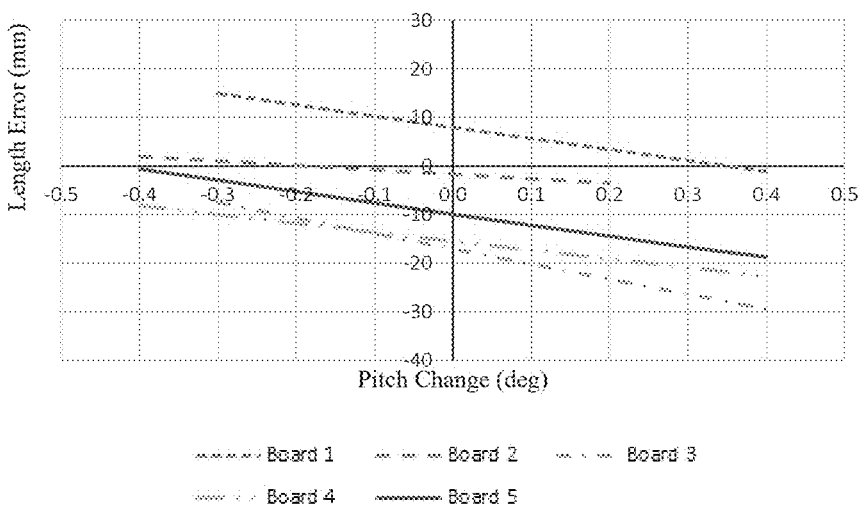
Figure 7: Example pitch parameter sensitivity

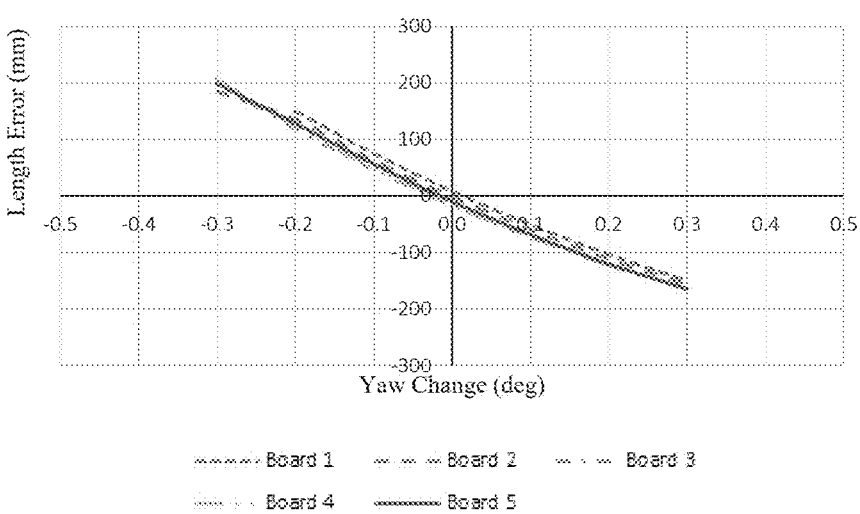
Figure 8: Example calibration sensitivity to yaw estimation error, post-calibration
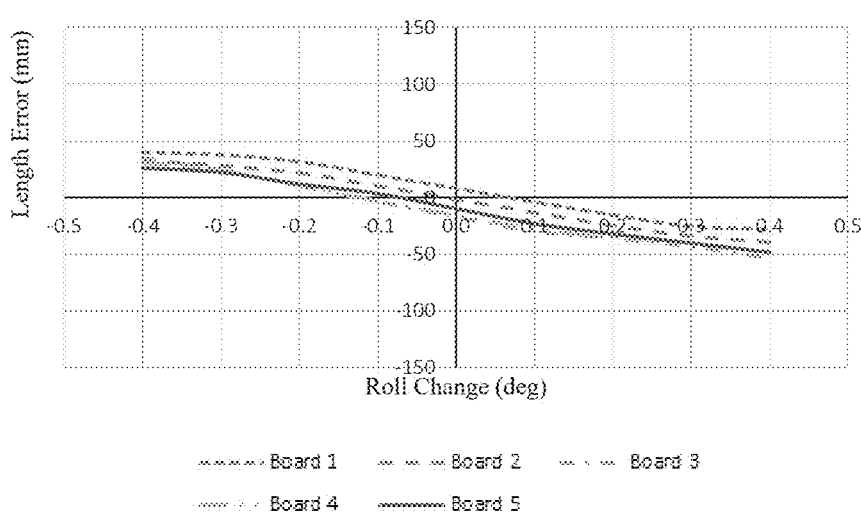
Figure 9: Example calibration sensitivity to roll estimation error, post-calibration Example Post-Calibration Measurement Error
Optical Center x location
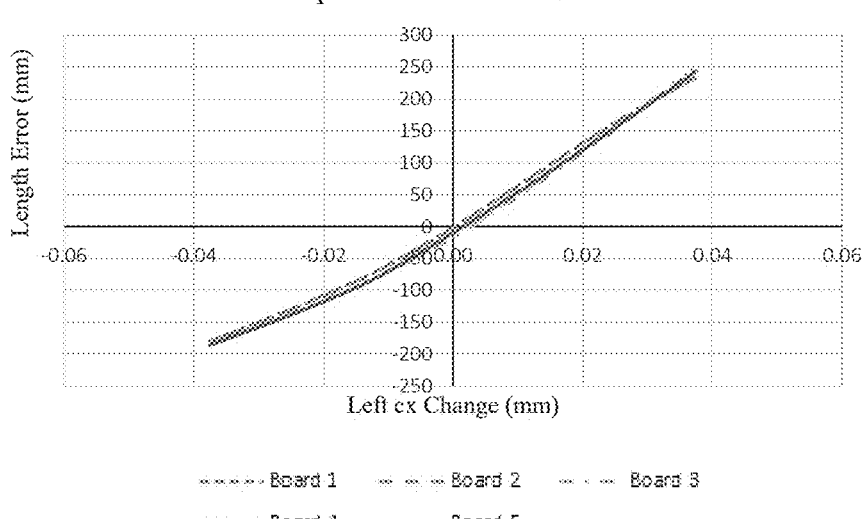
Figure 10: Example X optical center parameter sensitivity
Example Post-Calibration Measurement Error
Optical Center y location
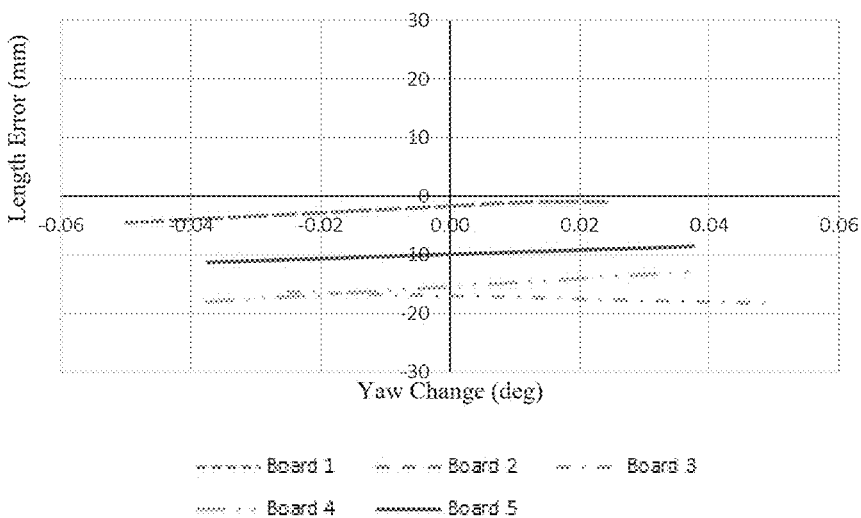
Figure 11: Example Y optical center parameter sensitivity

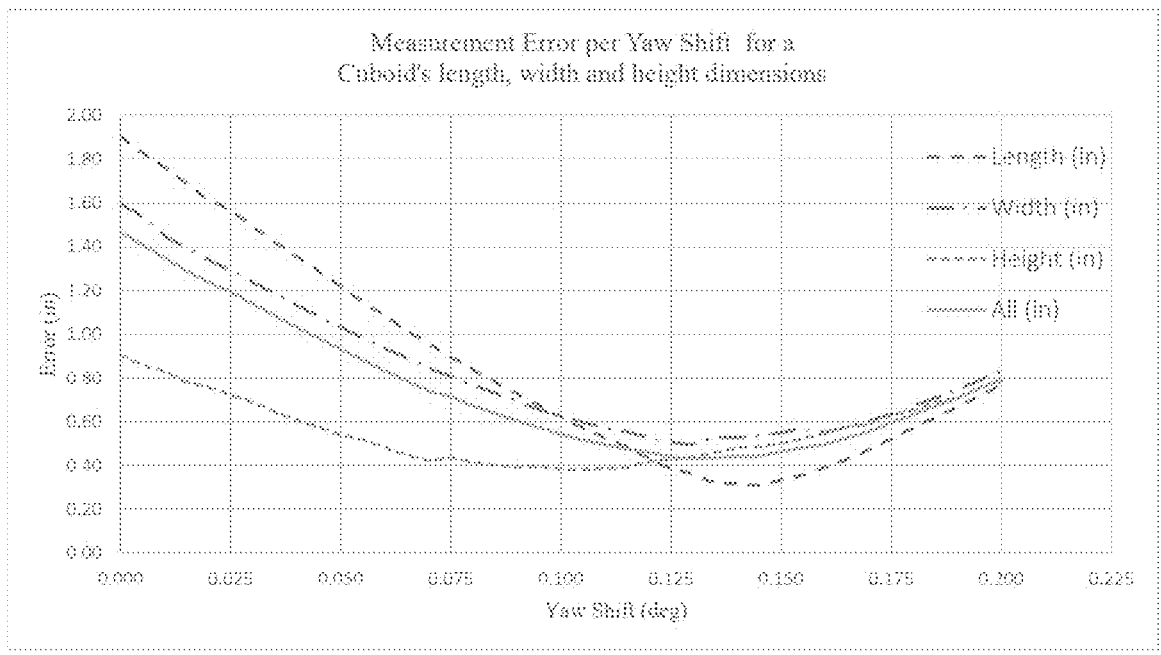
Figure 12: Dimensioning error minimization by modification of yaw parameter

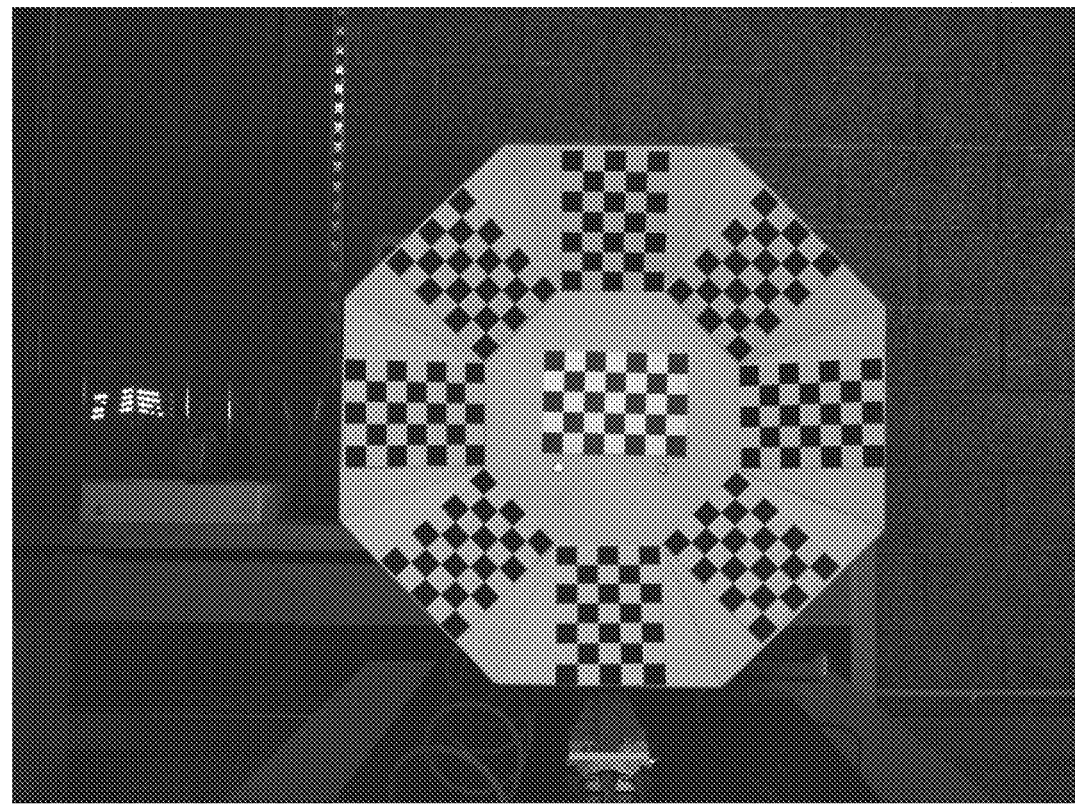
Figure 13: Calibration target and system

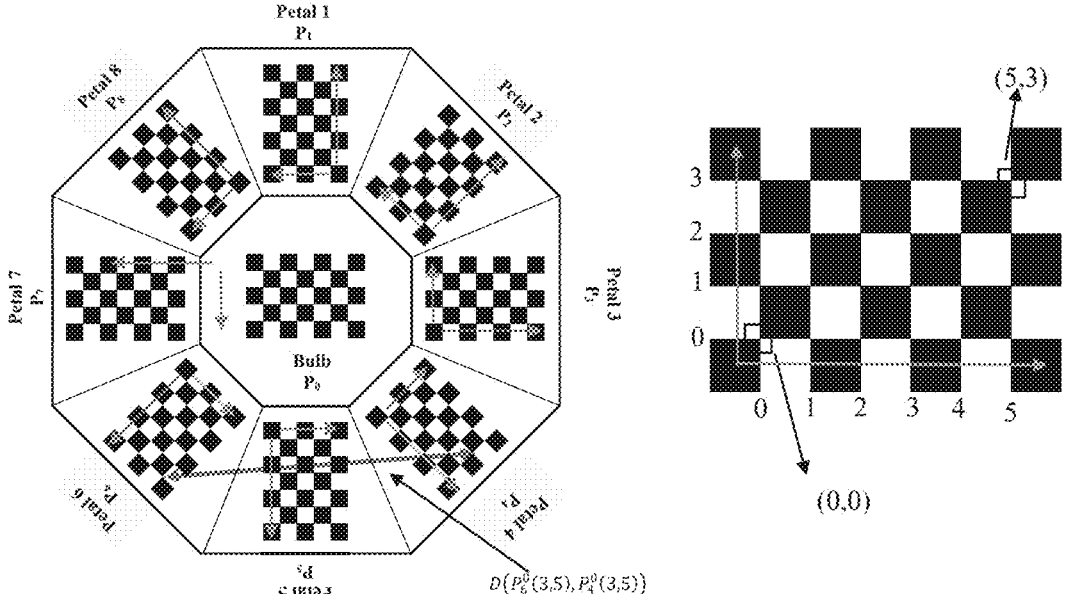
$P_n^k(i,j) \in \mathbb{R}^3 , 0 \leq n < N, 0 \leq k < M, 0 \leq i < 6, 0 \leq j < 4\}$
$N$: total number of patterns, $K$: total number of distance-based target positions from camera
$D$: Euclidean Distance
Figure 14: 3D measurements obtained from the calibration target to perform residual bias mitigation using a single calibration target at an individual location

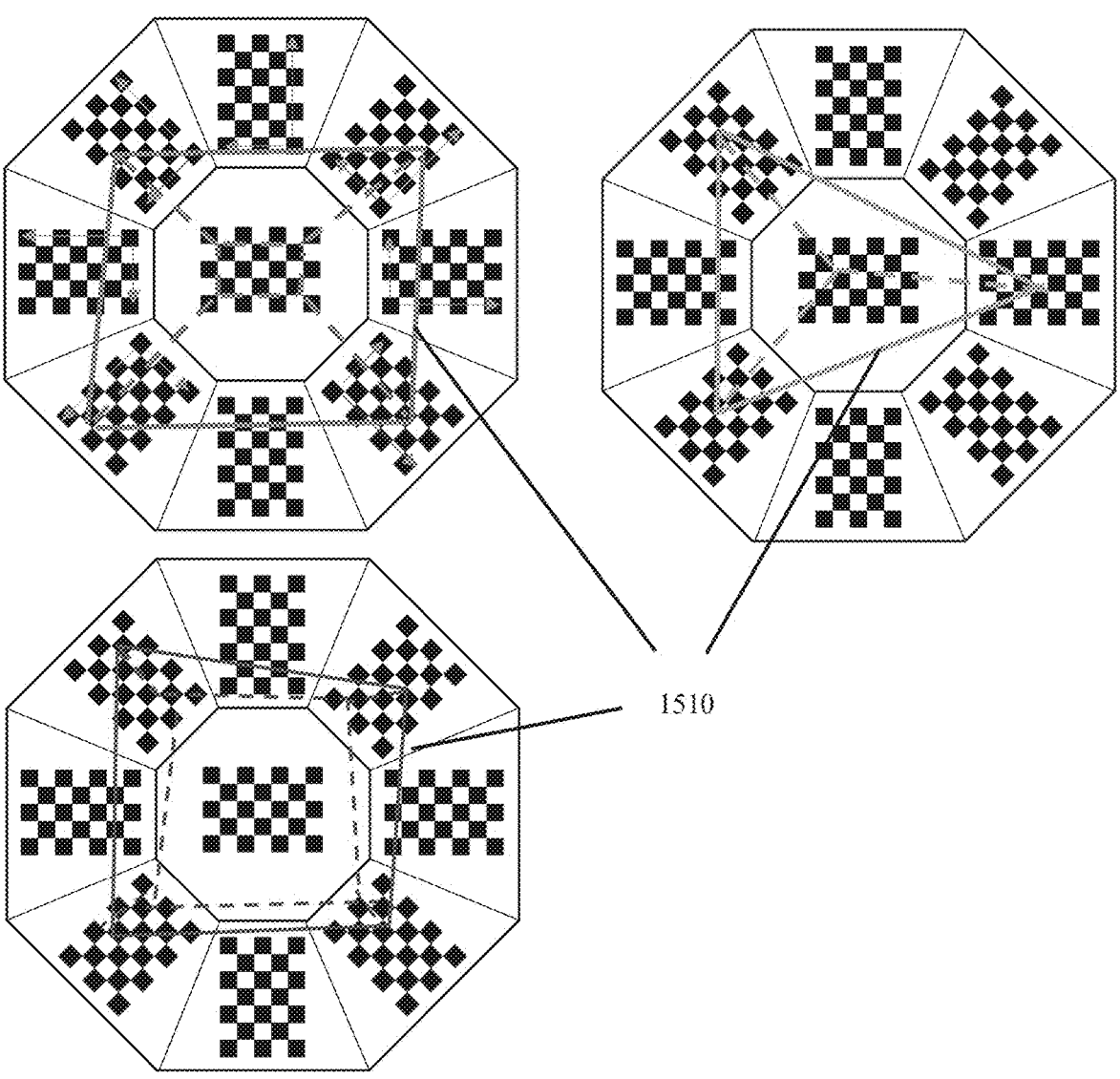
1510
Figure 15: Virtual 3D shapes on calibration target for bias mitigation

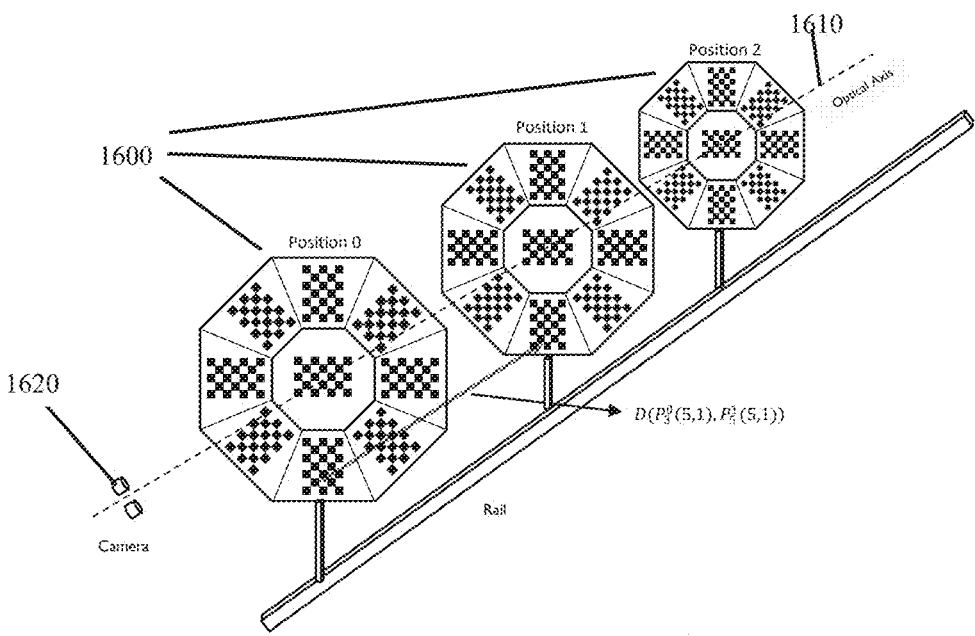
Figure 16: 3D measurements obtained from the calibration target to perform residual bias mitigation a single calibration target across different distances of the target from the camera
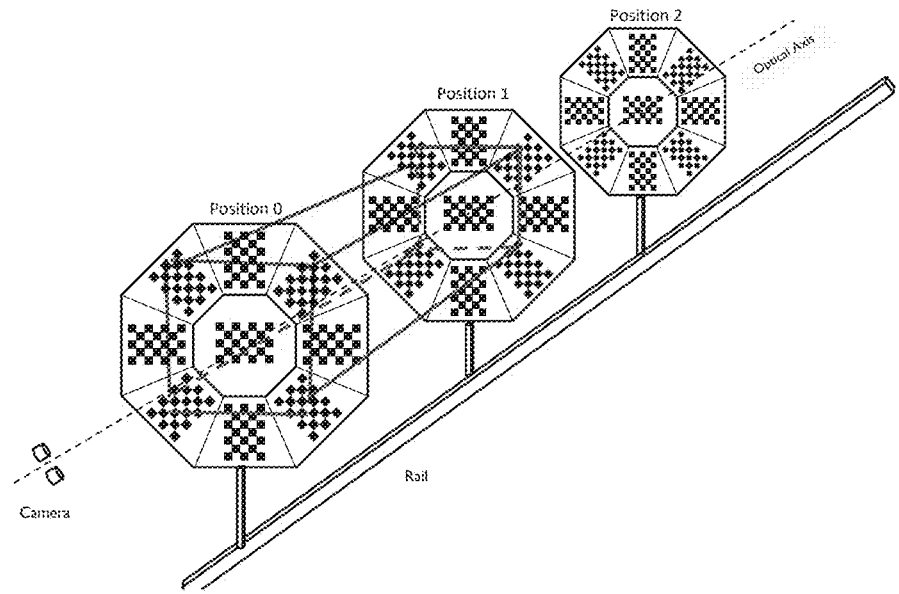
Figure 17: Virtual shapes on calibration target for bias mitigation over different distances of target from camera

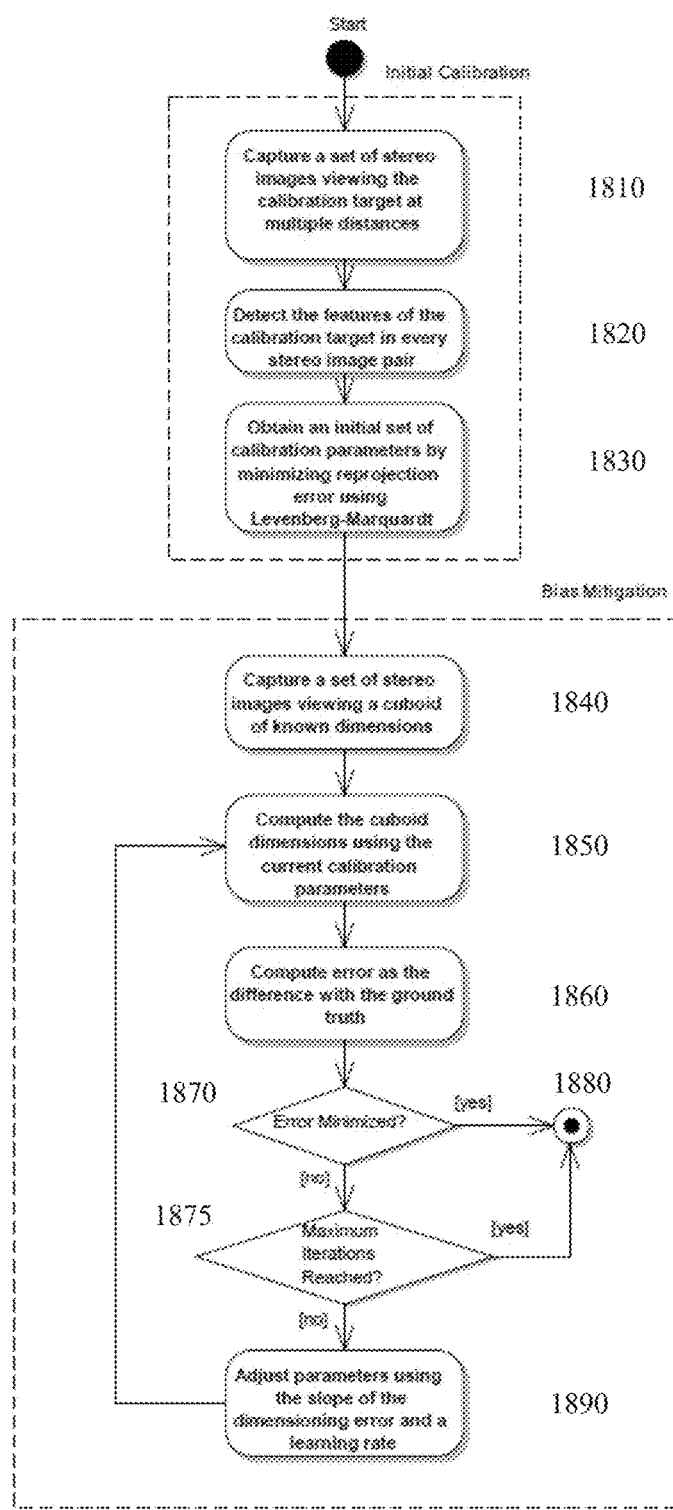
Figure 18: Residual bias mitigation flowchart with secondary calibration target

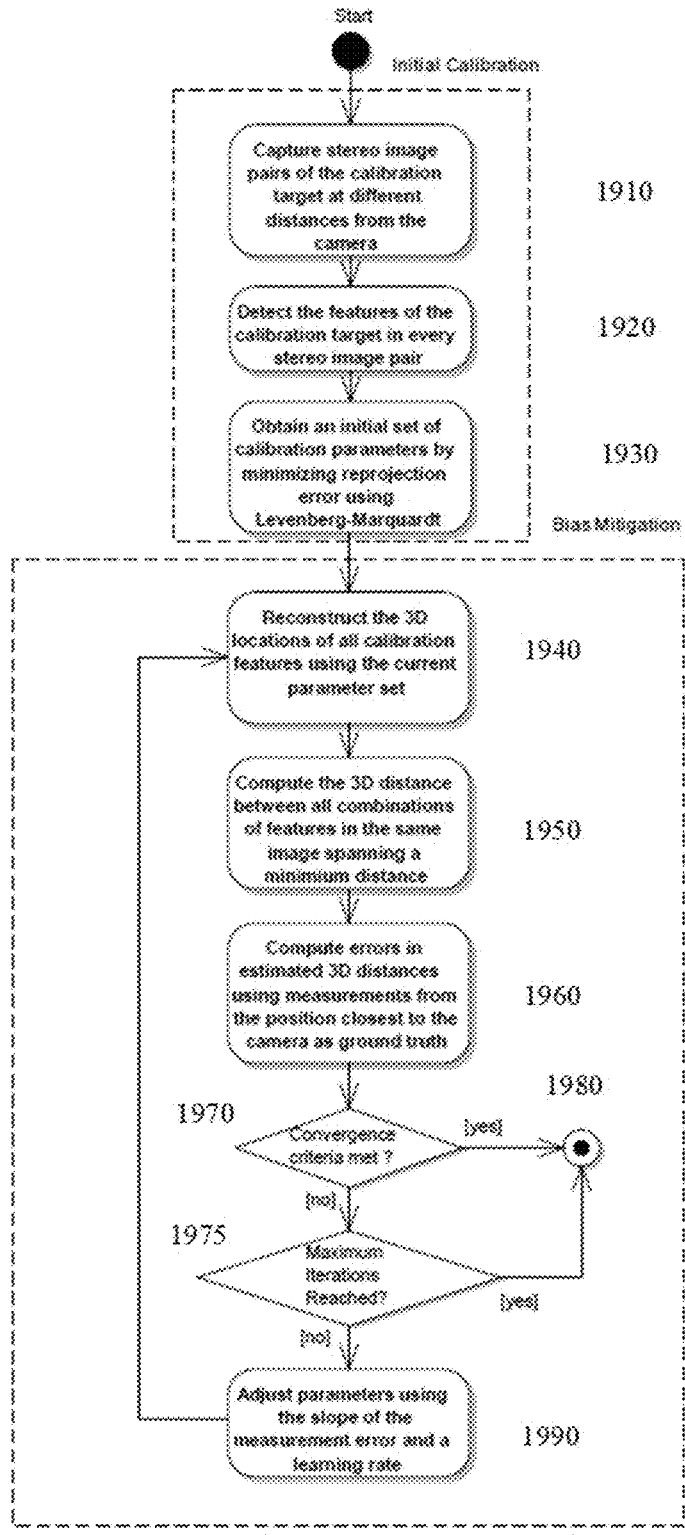
Figure 19: Residual bias mitigation flowchart with single calibration target

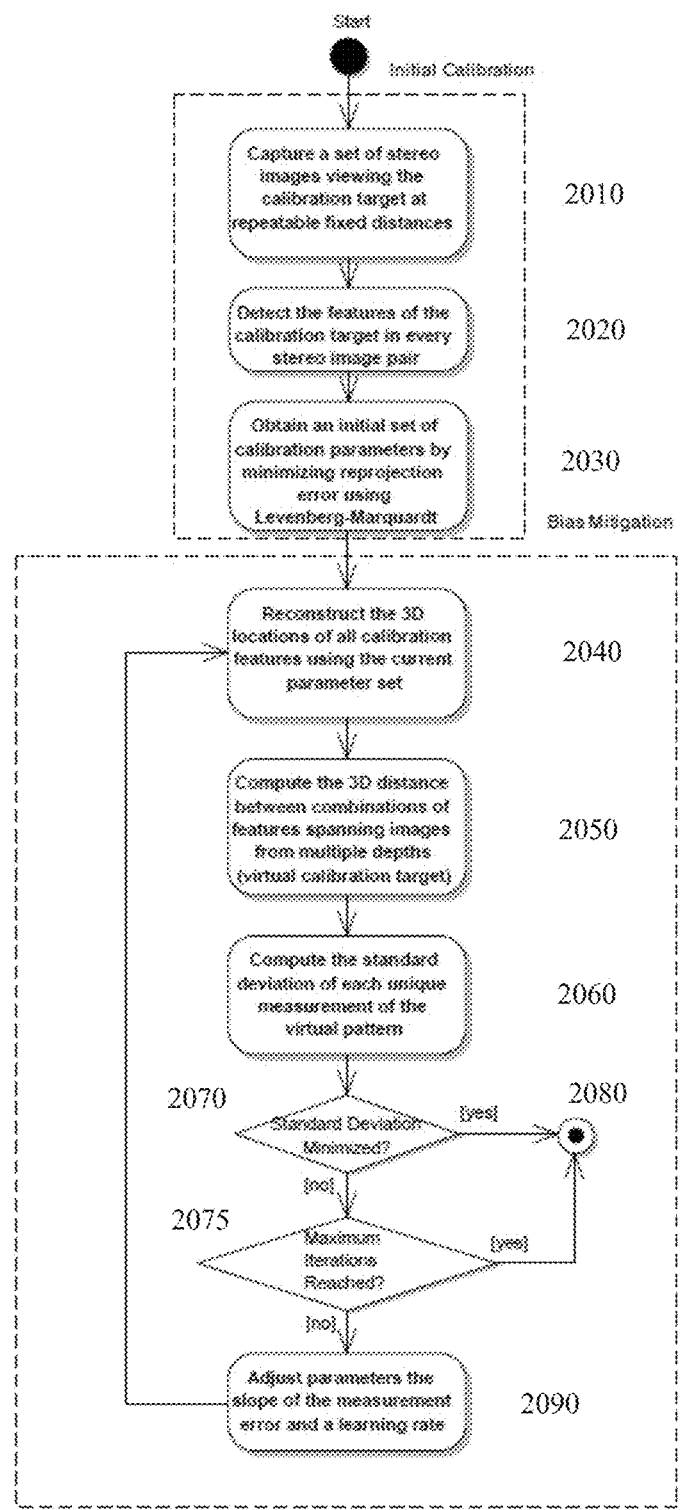
Figure 20: Residual bias mitigation flowchart with single calibration target based on standard deviation

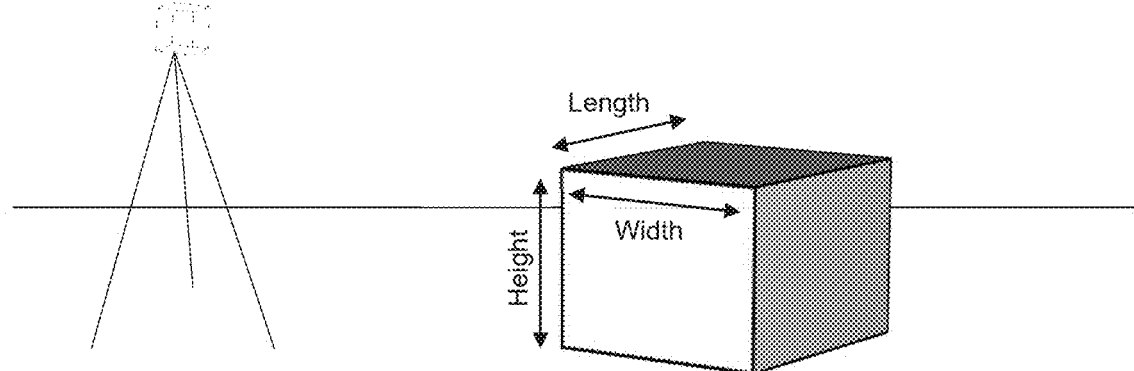
Figure 21: Bias mitigation with cuboidal target

RESIDUAL ERROR MITIGATION IN MULTIVIEW CALIBRATION

CROSS REFERENCE TO RELATED APPLICATIONS

This application is a continuation of U.S. patent application Ser. No. 17/562,069, filed Dec. 27, 2021 to El Dokor, et a., titled Residual Error Mitigation in Multiview Calibration, which is a continuation of U.S. patent application Ser. No. 16/882,702, filed May 25, 2020 to El Dokor et al., titled Residual Error Mitigation in Multiview Calibration, now U.S. Pat. No. 11,212,511, which is a continuation of U.S. patent application Ser. No. 16/038,225, filed Jul. 18, 2018 to El Dokor et al., titled Residual Error Mitigation in Multiview Calibration, now U.S. Pat. No. 10,666,926, which claims the benefit of U.S. Provisional Patent Application No. 62/534,175 filed Jul. 18, 2017 to El Dokor et al., titled Residual Error Mitigation in Multiview Calibration, and U.S. Provisional Patent Application No. 62/577,695 filed Oct. 26, 2017 to El Dokor et al., titled Residual Error Mitigation in Multiview Calibration, the contents of these applications being incorporated herein by reference.

At least one specification heading is required. Please delete this heading section if it is not applicable to your application. For more information regarding the headings of the specification, please see MPEP 608.01(a).

BACKGROUND

The inventors of the present invention have determined that multiview camera calibration has been an engineering challenge for a very long time. There are many tools and techniques that are available for calibration of multiview, especially stereo-based, camera systems. Calibration algorithms for stereo rigs traditionally aim at capturing the intrinsic and extrinsic parameters that are associated with a given stereo rig. Intrinsic parameters are parameters that are associated with the individual cameras themselves (focal length, pixel pitch, camera resolution, etc.) The extrinsic parameters as illustrated in FIG. 1 are ones that define the relationships between the various camera nodes in a stereo rig. These parameters include rotation parameters, like pitch, yaw, and roll. They also include translation parameters, like distance in x, y and z, of the nodes relative to each other. There are also many more parameters that can be estimated if they are needed in a three-dimensional scene analysis. Calibration aims at estimating such parameters based on a series of observations. Most calibration approaches require known three-dimensional information from the scene. Most of the time, the process calibration results in a relatively accurate system, capable of three-dimensional depth reconstruction.

The inventors of the present invention have further recognized that using these conventional approaches, stereo calibration has not been perfected in any way, and likely, never will. This is because stereo calibration intrinsically assumes parameters as part of its optimization process for triangulation. However, some of these parameters can not be estimated. At best, a tolerance stackup during manufacturing may be used for such a process. A tolerance stackup would include all of the tolerances that are associated with a manufacturing process, including all the hardware specs and components. For highly accurate three-dimensional reconstruction requirements, such parameters are inherently incorrect because some of the tolerances are too small a value for stereo, Time-of-flight or even structured light distance based computations. Take, for instance, the example of the extrinsic yaw parameter. Yaw, is a rotational angle measure governing horizontal rotation between left and right views in a stereo camera. Yaw estimation, along with other intrinsic and extrinsic parameters, is making assumptions about the system that are otherwise untrue. Key amongst such assumptions, for instance, is one in which the optical axis is aligned normally to the image sensor plane. The angle between the optical axes represents the yaw value. Reality, however, makes little sense or use of such cases. In fact, there is an inherent tilt between the optical axis and the image sensor plane that is not captured by the yaw estimation, in most any work that is associated with calibration. Any such remaining error in calibration will be referred to as residual error. The inventors of the present invention have determined that mitigating this residual error would result in improved accuracy of the solution.

It would therefore be beneficial to present a method and apparatus for overcoming the drawbacks of the prior art.

SUMMARY

The inventors of the present invention have further recognized that while calibration values are often accurate according to the standards of the state of the art, they are typically not accurate enough to be used in some practical situations involving distance and object measurements. This error manifests itself after the calibration process, which is aimed at the estimation of stereo parameters, completes that estimation process.

Calibration thus suffers from a form of residual error, and this residual error will impact the accuracy of the system. However, the inventors of the present invention have recognized that this residual error is based on the camera's response function, which is a monotonic function, and can therefore be mitigated to a large extent by adjusting such a monotonic function to more align with a ground truth set of parameters suited for a given camera and validated through a given ground-truth and known set of measurements.

One way to address this residual error would be to look at post-calibration system performance results and correct for the inherent remaining inaccuracies. Fundamentally, all stereo systems must adhere to a monotonically decreasing logarithmic curve, an example of which is depicted in FIG. 2. This curve of disparity, d, vs. distance, D, is governed by Equation 1, which is a simplified version of the logarithmic depth/disparity curve:

$$D = \frac{Bf}{pd} \qquad \text{Equation 1}$$

Where B is the baseline distance between the stereo cameras, f is the focal length of the cameras, and p is the size of the pixel. FIG. 3 depicts an example of the disparity vs. distance curve representative of a 6 cm baseline, 6 micron pixel, and a 4.5 mm focal length. Given a set of calibration parameters, and a few observations, the overall performance of the system may be predicted with a high degree of certainty, since the measurements adhere to the stereoscopic relationship that is defining depth resolution vs. distance.

Therefore, in accordance with one or more embodiments of the present invention, a new set of residual error mitigation approaches has been presented. This set of approaches addresses the inaccuracies that are associated with multiview passive and active stereo calibration. These approaches are also applicable to other depth sensing cameras. The approaches reduce the "inherent bias", which is a representation of the residual error in the data itself and in the overall tolerance stackup of a given manufacturing process. As noted by the inventors of the present invention, Residual error in depth estimation exists in conventional calibration techniques associated with multiview cameras. This error is nearly impossible to remove from an initial first pass of data processing, especially in measurement applications. Therefore, in accordance with one or more embodiments of the present invention, a secondary processing step is preferably performed separate from the initial processing step, aimed at removing this residual error. The application of this second processing step to remove residual error takes into account the fact that most lenses are not perfectly isotropic and have imperfections, and that the optical axis of the lens is seldom perfectly orthogonal to the image sensor plane, causing a number of errors in calibration parameter estimation. As a result, keeping in mind a Modulation Transfer Function (MTF) that is associated with these cameras matters, residual error mitigation may be performed in accordance with one or more embodiments of the invention by obtaining a number of measurements post-initial calibration, and then addressing the remaining bias or residual error by modifying given critical parameters, such as yaw, roll or pitch, and optical axis independently or collectively, to minimize error components of these measurements. Both intrinsic parameters (inherent to an individual view) and extrinsic parameters (relationship between views) may be used in isolation or collectively to remove residual error.

Effect of Different Calibration Parameters on Calibration—Accuracy Sensitivity

To better understand the effect of each estimated calibration parameter on the overall accuracy of the system, each individual intrinsic and extrinsic parameter sensitivity is evaluated independently. The accuracy is then determined based on that sensitivity. Sensitivity is hence defined as the ratio of measurement error to the change in a given intrinsic or extrinsic parameter (a step). Sensitivity is estimated by recording the error in one or more sets measurements at multiple calibration steps. FIGS. 4 through 11 present example parameter sensitivities for a set of 100 cm length measurements using five different stereo boards. For each board, the individual rotation, translation, and optical center parameters were shifted ±0.4 deg, ±1 mm, and ±0.05 mm in steps of 0.1 deg, 0.25 mm, and 0.0125 mm respectively, with the resultant length error being graphed.

Referring again to the graphs presented in FIGS. 4 through 11, it becomes quickly apparent that the system's overall calibration sensitivity to yaw (see FIG. 8), as well as the optical axis alignment in X (see FIG. 10) is disproportionately large compared to other parameters. Both of these parameters play a very important role in determining the accuracy of a stereo or multiview measurement device. For instance, a very small change in yaw, for instance, less than 0.01 degrees may correspond to a measurement error of a few cm at 2 m or more away.

There are no conventional practical methods in a mass production environment to address such sensitivity other than to make calibration more granular and/or add a refinement step to calibration, iterating modifications to the parameters themselves and then producing a more solid and repeatable set of measurements. Moreover, yaw estimation fundamentally assumes that the optical axis and the image sensor plane are orthogonal. They never are, statistically speaking. Optical axis alignment with the physical image sensor plane is another assumption that almost never holds true. In either case, it is important to develop an approach to minimize the residual error that is remaining in calibration itself.

Still other objects and advantages of the invention will in part be obvious and will in part be apparent from the specifications and drawings.

The invention accordingly comprises the several steps and the relation of one or more of such steps with respect to each of the others, and the apparatus embodying features of construction, combinations of elements and arrangement of parts that are adapted to affect such steps, all as exemplified in the following detailed disclosure, and the scope of the invention will be indicated in the claims.

BRIEF DESCRIPTION OF THE DRAWINGS

FIG. 1 is a graph depicting rotation and translation parameters of an example stereo camera;

FIG. 2 is graph depicting an example depth curve of a stereo camera;

FIG. 3 is a graph depicting an example depth curve of a stereo camera with 6 cm baseline and 6 micron pixel;

FIG. 4 is a graph depicting an example post calibration X translation parameter sensitivity of a calibration system;

FIG. 5 is a graph depicting an example post calibration Y translation parameter sensitivity of a calibration system;

FIG. 6 is a graph depicting an example post calibration Z translation parameter sensitivity of a calibration system;

FIG. 7 is a graph depicting an example post calibration pitch angle rotation parameter sensitivity of a calibration system;

FIG. 8 is a graph depicting an example post calibration yaw angle rotation parameter sensitivity of a calibration system;

FIG. 9 is a graph depicting an example post calibration roll angle rotation parameter sensitivity of a calibration system;

FIG. 10 is a graph depicting an example post calibration X optical center parameter sensitivity of a calibration system;

FIG. 11 is a graph depicting an example post calibration Y optical center parameter sensitivity of a calibration system;

FIG. 12 is a graph depicting an example of dimensioning error minimization by modification of yaw parameter in accordance with an embodiment of the invention;

FIG. 13 depicts a calibration system for use in accordance with the present invention;

FIG. 14 depicts 3D measurements obtained from the calibration target to perform residual bias mitigation using a single calibration target at an individual location in accordance with an embodiment of the invention;

FIG. 15 depicts 3D measurements obtained from the calibration target to perform residual bias mitigation on a single calibration target across different distances of the target from the camera in accordance with an embodiment of the invention;

FIG. 16 depicts a flowchart for residual bias mitigation using a secondary calibration target;

FIG. 17 depicts a flowchart for residual bias mitigation using a single calibration target;

FIG. 18 depicts a flowchart for residual bias mitigation flowchart with a virtual calibration target;

FIG. 19 depicts a flowchart for residual bias mitigation with a cuboidal target;

FIG. 20 depicts a flowchart for residual bias mitigation with a single calibration target based on standard deviation; and FIG. 21 depicts a system for bias mitigation based on a cuboidal target of known dimensions.

DETAILED DESCRIPTION

Minimizing Residual Error

As previously described, it becomes next to impossible to obtain every parameter as accurately as possible for a given measurement application, given the demand on accuracy that some of these applications require. A numerical approach is one of many that can be used to address the residual error problem. In fact, any approach, be it gradient descent, Levenberg-Marquardt (Levenberg, Kenneth (1944). "A Method for the Solution of Certain Non-Linear Problems in Least Squares". Quarterly of Applied Mathematics. 2:164-168, Marquardt, Donald (1963). "An Algorithm for Least-Squares Estimation of Nonlinear Parameters". SIAM Journal on Applied Mathematics. 11 (2): 431-441.), or a greedy algorithm (Introduction to Algorithms (Cormen, Leiserson, and Rivest) 1990, Chapter 17 "Greedy Algorithms" p. 329.), among others that may be used.

In accordance with a first embodiment of the invention as depicted in, for example, FIG. 1, a numerical approach to minimizing the residual error in calibration is presented. A stereo system consists of two or more cameras each modeled by set of intrinsic parameters (for example focal length, fx, fy, skew, s, and lens distortion, $\alpha 1 \ldots n$) and related to each other by a set of extrinsic parameters (for example, translation, Tx, Ty, Tz, and rotation, p, y, r). These calibration parameters enable 3D measurement of corresponding 2D locations via stereo triangulation, where the error is defined as the difference between the ground truth triangulations and the estimated 3D locations. Given a set of n ground truth measurements, such that:

$$d_g \in \mathbb{R}^n \qquad \text{Equation 1}$$

There exists corrupted data post-calibration such that:

$$d_g + e = d_o \qquad \text{Equation 2}$$

Where $d_o$ is the observed value.

It is known that the observed value $d_o$ is a function of the estimated ordered set of calibration parameters C, where $$\mathbb{C} = \{c_x, c_y, T_x, T_y, T_z, p, y, r, \ldots \} \qquad \text{Equation 3}$$

where $c_x$ and $c_y$ represent the optical centers in x- and y-dimensions respectively. There are separate optical centers associated with every camera and these constitute part of the camera's intrinsic parameters $T_x$, $T_y$, $T_z$ represent the translation the translations in x-, y- and z-respectively between two views of a multiview system, and p, y, r, respectively represent the pitch, yaw and roll between two views of a multiview system. A complete list of parameters is significantly longer, and also contains various distortion parameters as well as other three-dimensional reconstruction parameters that are representative of various angles and various degrees of freedom. The ordered set of parameters may further be generalized into:

$$\mathbb{C} = \{c_0, c_1, \ldots, c_{n-1}\}, \text{an } n\text{-dimensional set.} \qquad \text{Equation 4}$$

It then follows that calibration tries to minimize a cost function using a reprojection error minimization cost function, an epipolar line constraint cost function, or one or more other known cost functions. (See, for example: Z. Zang, "Flexible camera calibration by viewing a plane from unknown orientations," in Proceedings of the Seventh IEEE International Conference on Computer Vision, Kerkyra, 1999. Y. Cui, F. Zhou, Y. Wang, L. Liu and H. Gao, "Precise calibration of binocular vision system used for vision measurement," Optics Express, vol. 22, no. 8, pp. 9134-9149, 2014. D. Bradley and W. Heidrich, "Binocular Camera Calibration Using Rectification Error," in 2010 Canadian Conference on Computer and Robot Vision, Ottawa, 2010.) the contents of these references incorporated herein by reference). Any and all of these cost functions, however, will leave behind residual error, for the various reasons noted above. It then follows that, to minimize the error, a second processing step or series of processing steps for recalibrating, or modifying the cost function in accordance with an embodiment of the present invention may be performed to address this issue.

FIGS. 4-11 are graphs that depict the effect on a length error in a box measuring system (Y-Axis) as a result of imperfections in the estimation of a particular parameter (X-Axis), including translation in the X, Y or Z directions, Pitch, Yaw or Roll angle rotations, and X and Y optical center location. As is evident from these graphs, as noted above, and as will be described in greater detail below, Yaw error (and to some extent, roll error) is the overriding parameter that affects proper calibration. As noted above, FIGS. 4 through 11 present example parameter sensitivities for a set of 100 cm length measurements using five different stereo boards. For each board, the individual rotation, translation, and optical center parameters were shifted ±0.4 deg, ±1 mm, and ±0.05 mm in steps of 0.1 deg, 0.25 mm, and 0.0125 mm respectively, with the resultant length error being graphed.

FIG. 13 depicts a calibration system for use in accordance with one or more embodiments of the present invention. The calibration system may be used to extract the original calibration values of a multiview system or stereo rig with an existing residual error, or for other aspects of calibration. A calibration target with one or more known patterns, such as dots or a checkerboard, is preferably moved to one or more predetermined locations, located at predetermined distances from a device to be calibrated. Given the known predetermined parameters, such as the size of the checkerboard, residual errors or other variables may be determined during the calibration process, thus allowing for the calibration process further described in accordance with the present invention to be implemented. Of course, other calibration system hardware may be utilized to implement the calibration process of the present invention.

As an example, in accordance with an embodiment of the invention, assume that Cg represents the estimated ground truth calibration parameter that can be used for a measurement or an object dimensioning application. Now, assume that the only parameter responsible for the error is the yaw parameter, $c_y$. It then follows that modifying the yaw parameter alone can properly address the error associated with the measurement values, from the observed calibration values, such as:

$$\underset{C_y}{\arg\min}\, d_0(\mathbb{C}) \rightarrow d_g(\mathbb{C}) \qquad \text{Equation 5}$$

Hence, minimizing the error between the observed post calibration data, $d_o$, and the actual ground truth data, $d_g$, is achieved through the manipulation of the yaw parameter, $C_y$, over a series of observations, culminating in a global minimum. It then follows that the overall minimization of the error can be accomplished by minimizing the difference between the observed measurement, $d_o$, and the ground truth $d_g$:

$$\arg\min_C d_0(C) \rightarrow d_g(C) \qquad \text{Equation 6}$$

where the most effective means for minimizing the residual error is to run a secondary calibration estimate that takes into account all the existing parameters and then minimizes the measurement-based cost function.

A Practical Example—Minimizing Yaw

Post calibration, a series of measurements of a set of boxes may be taken. These measurements represent the observed values, $d_o(C)$. To get to the final values, the observed values errors in length, width and height, are measured against there respective ground truth values.

Referring next to FIG. 4, post calibration measurement error for translation in the x-direction for five presented manufactured boards are presented. As is shown in FIG. 4, not only does the translation error differ for each of the presented boards (even though they were manufactured to the same hardware specifications) but also that there is a consistent linear relationship between the length error and the change in the translation on the x direction.

In FIG. 5, the same five boards are depicted on a graph of post calibration measurement error translation in the y directions. While a similar variation between boards is shown in comparison to FIG. 4, the changes in translation in the y direction are generally unrelated to length error.

Similarly, FIG. 6 depicts the same five boards on a graph of post calibration measurement error translation in the z direction. As is shown in FIG. 6, not only does the translation error differ for each of the presented boards (even though they were manufactured to the same hardware specifications) but also that there is a consistent inverse linear relationship between the length error and the change in the translation on the z direction.

Referring next to FIG. 7, post calibration measurement error for pitch angle rotation for the five presented manufactured boards are presented. As is shown in FIG. 7 similarly to FIG. 4, not only does the pitch angle rotation error differ for each of the presented boards (even though they were manufactured to the same hardware specifications) but also that there is a linear relationship (not necessarily consistent) between the length error and the pitch angle rotation.

Referring next to FIG. 8, post calibration measurement error for yaw angle rotation for the five presented manufactured boards are presented. As is shown in FIG. 8, not only does the pitch angle rotation error differ for each of the presented boards (even though they were manufactured to the same hardware specifications) but also that there is a somewhat linear relationship (although linearity appears to break at the highest yaw changes) between the length error and the yaw angle rotation. As noted above, and as will again be discussed below, the length error reported as a result of yaw change is an order of magnitude larger than the errors presented in FIGS. 4-7.

In FIG. 9, the same five boards are depicted on a graph of post calibration measurement error as related to roll angle rotation. While there is generally an inverse linear relationship between length error and roll change, the relationship is not quite linear.

Referring next to FIG. 10, post calibration measurement error for optical center x location for the five presented manufactured boards are presented. As is shown in FIG. 10, not only does the optical center x location error differ for each of the presented boards (even though they were manufactured to the same hardware specifications) but also that there is a somewhat linear relationship between the length error and the optical center x location error. As noted above, and as will again be discussed below, the length error reported as a result of optical center x location is an order of magnitude larger than the errors presented in FIGS. 4-7 and 9.

In FIG. 11, the same five boards are depicted on a graph of post calibration measurement error as related to optical center y location. While there is generally a linear relationship between length error and optical center y location, the error is generally quite small.

Reviewing the graphs presented in FIGS. 4 through 11, it becomes quickly apparent that the system's overall calibration sensitivity to yaw (see FIG. 8), as well as the optical axis alignment in X (see FIG. 10) is disproportionately large compared to other parameters. Both of these parameters play a very important role in determining the accuracy of a stereo or multiview measurement device. For instance, a very small change in yaw, for instance, less than 0.01 degrees may correspond to a measurement error of a few cm at 2 m or more away.

To further illustrate the point, the residual error in this given calibration example is one that is associated with just the yaw. Hence, the calibration parameter set, C, produces a set of observed measurements d. (C), following Equation 6. To minimize the error, a set of slight modifications to the yaw measurements, may be computed. These minute yaw shifts would lead to minimization of the difference between the observed measurements and the idealized measurements.

The process associated with an embodiment of the present invention involves a secondary processing step that regulates a given calibration to better address residual error. The final yaw value can then be used for any measurement and not be specific to this particular set of measurements. In FIG. 12, the results of minimizing yaw for a series of observed measurements is presented. In this case, the final yaw location was shifted by less than 0.125 degrees. Note that the process may also involve a single step instead of multiple steps. It may also include more parameters, such as the optics axis or the effective focal length (EFL), but fundamentally, the process will involve three-dimensional measurements from exemplar locations.

It is worth mentioning that the impact that yaw has on the overall outcome of calibration is significant, as has been stated earlier. In fact, yaw, optical center, and by extension, the effective focal length play an outsize role in residual error. In fact, yaw estimation in a mass production environment would be impossible to measure at as accurate a level. As a result, the next best option would be to use an estimation process, similar to the one suggested in accordance with the present invention.

In FIG. 8, note that yaw has two orders of magnitude greater impact on calibration/measurement accuracy than almost any other parameter. It becomes quite apparent that yaw mitigation should be at the core of any effort of accurate calibration and residual error calibration and measurement mitigation. In a more generalized sense, and for various other technologies, other parameters may be more crucial for accurate bias mitigation. In that case, the priority would be directed toward such more important parameters. Such cases exist in Time of flight or structured light cameras, with the latter especially needing calibration even with a light source being present in the field of view.

Practical Implementation for Calibration Parameter Modification

One possible implementation for error mitigation is to add a secondary calibration step to identify and compensate for bias in the calibration process. As an example dimensioning a series of highly accurate cuboidal objects may be used for such an approach. This is shown in FIG. 18. The measured dimensions from the initial calibration may be compared to the associated ground truth dimensions of the respective cuboidal objects. The observations may be known measurements for given sizes of the cuboid. Or, secondarily, the knowledge that a given set of observations is of the same box is sufficient to reconstruct calibration parameters.

The system shown in FIG. 21 may be employed, for example, for calibrating a target based upon a cuboid object, and includes a camera to be calibrated, and a target cuboidal object. A similar system may also be used after calibration to image the cuboidal object. As is therefore shown in FIG. 18 an initial calibration of a camera begins at step 1810 stereo image pairs of the calibration target at different distances from the camera are captured. Such a setting is shown in FIG. 16 where a calibration target 1600 is shown located at positions 0, 1, 2 along an optical axis 1610 distances from camera 1620. Next, at step 1820, one or more features of the calibration target are detected in each stereo image pair. At step 1830 an initial set of calibration parameters are then obtained by minimizing reprojection error using a Levenberg-Marquardt bias mitigation process.

Processing then passes to a bias mitigation process, beginning at step 1840 where a set of stereo images viewing a cuboid of known dimensions are captured. Then at step 1850 cuboid dimensions using the current calibration parameters are calculated. Next, at step 1860 errors for the calculated cuboid distances are computed preferably using measurements from the position closest to the camera as a ground truth. Processing then continues at step 1870 where it is queried whether error has been minimized. If this query is answered in the affirmative, and it is therefore determined that the error has been minimized, the process then ends at step 1880. If on the other and the query at step 1870 is answered in the negative, and it is determined that the error has not been minimized, processing continues at step 1875 where it is queried whether a maximum number of iterations has been reached. If this query is answered in the affirmative, and it is therefore determined that the maximum number of iterations has been met, the process then ends at step 1980. If on the other and the query at step 1875 is answered in the negative, and it is determined that the convergence criteria has not been met, processing continues at step 1990 where the parameters are adjusted, preferably in accordance with the slope of the measurement error and a learning rate, and processing then returns to step 1840.

Rather than employing actual cuboidal or other known shapes, it is also possible to implement the system employing virtual 3D shapes 1510 in relation to the calibration targets, such as those depicted in FIG. 15. This is important because it creates virtual shapes by connecting known 2D points of the calibration target. This allows for the ability to have a more robust calibration process by providing more variability in objects of known dimensions.

Therefore, referring again to FIG. 16, (and further in reference again to FIG. 18) the process starts with an initial calibration step comprising the collection of one or more images of the calibration target 1600 at multiple distances. This is followed by the detection of the features in each image of the calibration target and the determination of the initial parameters set using the Levenberg-Marquardt or similar optimization algorithm. The process is then followed by subsequent residual bias mitigation based on Equations 1 through 6 above, wherein a second set of images is captured of the cuboidal object and error in the object dimensions is iteratively minimized by computing the dimensions with the current calibration set. The error is estimated as the difference between the computed dimensions and the respective known ground truth measurements. Parameter adjustment is then automatically determined by using the slope of the dimensioning error and potentially a learning rate. Iteration continues until the error has been minimized or alternative exit criteria are reached, such as a maximum number of iterations.

A second practical implementation, depicted in FIG. 19, involves a single calibration in which features extracted from several images of the target at different distances from the camera are used to obtain an initial estimate of camera parameters that minimizes the reprojection error of the feature points using the Levenberg-Marquardt algorithm or another cost minimization algorithm. The estimated parameters are then used to extract features are used to compute several virtual length and width measurements from the original calibration fixture. FIG. 14 illustrates the features extracted and a sample 3D distance for an embodiment of this approach.

These extracted virtual features can be combined, as depicted in FIG. 15, to have a three-dimensional geometric shape, such as a trapezoid or a cuboid.

These extracted shape measurements don't even have to be cuboidal, but should substantially cover the field of view of the stereo rig or multiview camera system and should contain points that vary in depth. If points on the calibration target as represented as a set P with each element $P_i=(x,y,z)$ representing the 3D coordinates of the point, then we can consider measurements over multiple point-pairs such that the points have a minimum depth difference and a minimum measurement value, meaning it is preferred to have measurements that span larger distances. An illustration of this is given in FIG. 14 which shows the calibration target with a sample measurement taken as the Euclidean distance across two points on the target that are at different depths. These measurements can also be combined to form virtual three-dimensional shapes like a cuboid as shown in FIG. 17. Ground-truth values for the measurements can be manually obtained. Alternatively, if obtaining such ground-truth values manually is impractical, measurements made at a location nearest to the camera can be considered as ground-truth, since the error at the closest position to the camera is minimal. An iterative optimization procedure can then be run to find the change in optical parameters such as yaw, which minimize the residual error. The updated parameter set is then included in the final parameter value set that is returned as part of the calibration process.

This process is described in FIG. 19, where an initial calibration of a camera begins at step 1910 where stereo image pairs of the calibration target at different distances from the camera are captured. Next, at step 1920, one or more features of the calibration target are detected in each stereo image pair. At step 1930 an initial set of calibration parameters are then obtained by minimizing reprojection error using a Levenberg-Marquardt bias mitigation process.

Processing for bias mitigation then begins at step 1940 where 3D locations of all calibration using the current set of calibration parameters are reconstructed. Then at step 1950 the 3D distance between all combinations of features in the same image spanning a minimum distance. Next, at step 1960 errors for the estimated 3D distances are computed preferably using measurements from the position closest to the camera as a ground truth. Processing then continues at step 1970 where it is queried whether a convergence criteria has been met for the computed errors. If this query is answered in the affirmative, and it is therefore determined that the convergence criteria have been met, the process then ends at step 1980. If on the other and the query at step 1970 is answered in the negative, and it is determined that the convergence criteria has not been met, processing continues at step 1975 where it is queried whether a maximum number of iterations has been reached. If this query is answered in the affirmative, and it is therefore determined that the maximum number of iterations has been met, the process then ends at step 1980. If on the other and the query at step 1975 is answered in the negative, and it is determined that the convergence criteria has not been met, processing continues at step 1990 where the parameters are adjusted, preferably in accordance with the slope of the measurement error and a learning rate, and processing then returns to step 1940.

Referring next to FIG. 20, a method for residual bias mitigation flowchart with single calibration target based on standard deviation is shown. As is therefore shown in FIG. 20 an initial calibration of a camera begins at step 2010 stereo image pairs of the calibration target at different distances from the camera are captured. Such a setting is shown in FIG. 16 where a calibration target 1600 is shown located at positions 0, 1, 2 along an optical axis 1610 distances from camera 1620. Next, at step 2020, one or more features of the calibration target are detected in each stereo image pair. At step 2030 an initial set of calibration parameters are then obtained by minimizing reprojection error using a Levenberg-Marquardt bias mitigation process.

Processing then passes to a bias mitigation process, beginning at step 2040 where the 3D locations of all calibration features using the current parameter set are reconstructed. Then at step 2050 the 3D distance between combinations of features spanning images from multiple depths (virtual calibration target) are computed. Next, at step 2060 the standard deviation of each unique measurement of the virtual pattern is computed. Processing then continues at step 2070 where it is queried whether the standard deviation has been minimized. If this query is answered in the affirmative, and it is therefore determined that the standard deviation has been minimized, the process then ends at step 2080. If on the other and the query at step 2070 is answered in the negative, and it is determined that the standard deviation has not been minimized, processing continues at step 2075 where it is queried whether a maximum number of iterations has been reached. If this query is answered in the affirmative, and it is therefore determined that the maximum number of iterations has been met, the process then ends at step 2080. If on the other and the query at step 2075 is answered in the negative, and it is determined that the convergence criteria has not been met, processing continues at step 2090 where the parameters are adjusted, preferably in accordance with the slope of the measurement error and a learning rate, and processing then returns to step 2040.

Another variant of the aforementioned approach would be to obtain measurements across successive known target locations which are at different distances from the camera, forming a virtual calibration target as shown in FIG. 16. In both these variants, if obtaining ground-truth measurements is impractical, then measurements obtained by 3-D reconstruction using the initial parameters for the location of the target nearest to the camera may be used as ground-truth, because of the aforementioned reasons.

The standard deviation may also be minimized across all observations of the same measurement in place of an absolute error term. This variant is summarized in FIG. 20, where an initial calibration is performed by collecting multiple images of the calibration target at either a set of known distances or a set of unknown distances separated by a known fixed interval. As in FIGS. 16 and 17, the initial calibration parameters are then determined by detecting the features of the calibration target in each image and optimizing the parameters using a Levenberg-Marquardt type of algorithm or another cost minimization algorithm. For residual bias mitigation, all or a subset of the features are then triangulated using the current calibration parameters. The Euclidean distance between a set of features spanning multiple images is then extracted forming a series of dimensioning measurements. The standard deviation can then be taken for all measurements spanning the same fixed interval or known distance. If the standard deviation is not minimized, one or more calibration parameters can be adjusted using the slope of the standard deviation and a learning rate. The process can then be repeated from triangulation with exit criteria defined by either have the cost being minimized or by having the maximum number of iterations reached.

Therefore, in accordance with an embodiment of the invention, a calibration process consisting of an initial calibration employing a more conventional checker or other periodic pattern may be first used to generate more standard initial calibration parameters. This initial calibration is then preferably followed by a second, residual error removal calibration that is preferably performed employing boxes or other measurement units whose ground truth values are known, and which is preferably implemented on a repeatable, known hardware system to ensure that the parameters associated with the calibration system are consistent.

No Reference Calibration and Calibration Modification for Residual Error Removal-Autocalibration and Auto-Recalibration In accordance with a further embodiment of the invention, residual error removal may also be performed in-field. This can be accomplished by calculating the given values of cost functions associated with a given dimensioning implementation, without actually knowing that dimension. The knowledge of a non-changing dimension is enough to enable a cost function to minimize around a given set of parameters. One way to do so is to calculate the derivative of the cost function, if the cost function were based on three-dimensional information from the scene. Given a series of 3D measurements of the same length, width or height, a cost function may be based on minimizing the error between the different dimensions. Given a set of calibration parameters, the cost function can be minimized by taking its derivative, given that all the measurements are equal and constant, the derivative should minimize to zero. The parameter estimation then proceeds to estimate the parameters that mostly minimize the error between the different measurements in a given measurement set.

Extension to Active Stereo Cameras and to Other Types of Active Light Source Cameras Active stereo cameras may be calibrated with the same process of residual error minimization that has been described in this disclosure. The process described in Equation 5 and Equation 6 may be used to remove residual error that is associated with active stereo cameras. The same concept would apply to other depth-sensing active light cameras, since all cameras will have an inherent bias and all of their depth resolutions will exhibit approximately monotonic behaviors over distance.

Real World Lens Resolution Imperfections and Mitigation

In practical examples, residual issues will remain beyond simply modifying and addressing the bias. Many lenses are not isotropic. Therefore, the inventive process that takes into account localized Modulation Transfer Function (MTF) information for a given lens becomes important. As a result, the realistic residual error mitigation goes beyond simply accounting for existing theoretical curve error minimization of a typical monotonic function, and takes into account MTF differences between different portions of the lens and between different lenses of a multiview system.

Multithreading

Collection of images, detection of calibration features, determination of parameters, triangulation, error minimization, and the majority of the algorithms described in FIGS. 16, 17, and 18 can be run in a multithreaded fashion on the CPU or parallelized on the GPU.

Utilizing calibration parameters to validate the manufacturing process: once the residual error is removed (or even prior to that), calibration itself can help validate other aspects of the manufacturing process, including lens placement, baseline conformance, and any number of other agreed to tolerances by a given manufacturer, based on a spec sheet and an associated predefined tolerance stack.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that this description is intended to cover all of the generic and specific features of the invention herein described and all statements of the scope of the invention which, as a matter of language, might be said to fall there between.

What is claimed:

1. A method for error mitigation, comprising:
  capturing one or more images viewing an object of known dimensions;
  computing one or more object dimensions using an initial set of calibration parameters;
  computing an error in the computed one or more dimensions by comparing the computed dimensions to the known dimensions;
  determining whether the error has been minimized;
  if it is determined that the error has not been minimized, adjusting the initial set of calibration parameters; and
  returning to the step of computing the dimensions of the object using an adjusted current set of calibration parameters in place of the initial set of calibration parameters.

2. The method of claim 1, wherein the initial set of calibration parameters are is determined according to the steps of:
  capturing one or more images viewing a known calibration target having known dimensions at a plurality of distances;
  detecting one or more known features of the calibration target in each of the one or more images captured at the plurality of distances; and
  obtaining an initial set of calibration parameters by minimizing reprojection error.

3. The method of claim 2, wherein the reprojection error is minimized employing a Levenberg-Marquardt process.

4. The method of claim 1, wherein the calibration parameters are adjusted in accordance with a slope for the dimensioning error and a learning rate.

5. The method of claim 1, wherein the calculated error is related to a yaw error of the object.

6. The method of claim 1, wherein the calculated error is related an optical axis alignment in X error of the object.

7. The method of claim 1, wherein the calculated error is related to one or more parameters selected from the group of X translation parameter sensitivity of a calibration system, Y translation parameter sensitivity of a calibration system, Z translation parameter sensitivity of a calibration system, pitch angle rotation parameter sensitivity of a calibration system, yaw angle rotation parameter sensitivity of a calibration system, roll angle rotation parameter sensitivity of a calibration system, X optical center parameter sensitivity of a calibration system, and Y optical center parameter sensitivity of a calibration system.

8. A method for error mitigation with a single calibration target, comprising:
  capturing one or more images viewing a known calibration target having known dimensions at a plurality of distances;
  detecting one or more known features of the calibration target in each of the one or more images captured at the plurality of distances;
  obtaining an initial set of calibration parameters by minimizing reprojection error;
  reconstructing one or more locations of a plurality of calibration features using the current set of calibration parameters;
  computing the distance between a plurality of combinations of features in the same image spanning a minimum distance;
  computing one or more errors in the computed distances using measurements from a predetermined position relative to the camera as the ground truth;
  determining whether one or more convergence criteria have been met;
  if it is determined that the one or more convergence criteria have not been met, adjusting the initial set of calibration parameters; and
  returning to the step of reconstructing one or more locations of a plurality of calibration features using the current set of calibration parameters in place of the initial set of calibration parameters.

9. The method of claim 8, wherein the calculated error is related to a yaw error of the object.

10. The method of claim 8, wherein the calculated error is related an optical axis alignment in X error of the object.

11. The method of claim 8, wherein the calculated error is related to one or more parameters selected from the group of X translation parameter sensitivity of a calibration system, Y translation parameter sensitivity of a calibration system, Z translation parameter sensitivity of a calibration system, pitch angle rotation parameter sensitivity of a calibration system, yaw angle rotation parameter sensitivity of a calibration system, roll angle rotation parameter sensitivity of a calibration system, X optical center parameter sensitivity of a calibration system, and Y optical center parameter sensitivity of a calibration system.

12. A method for error mitigation, comprising:
  capturing one or more images viewing a known calibration target having known dimensions at a plurality of distances;

detecting one or more known features of the calibration target in each of the one or more images captured at the plurality of distances;

obtaining an initial set of calibration parameters by minimizing reprojection error;

reconstructing one or more locations of a plurality of calibration features using the current set of calibration parameters;

computing the distance between a plurality of combinations of features spanning images from multiple depths comprising a virtual calibration target;

computing a standard deviation of each unique measurement of the virtual calibration target;

determining whether the standard deviation has been minimized;

if it is determined that the standard deviation has been minimized, adjusting the initial calibration parameters; and returning to the step of reconstructing one or more locations of a plurality of calibration features using the current set of calibration parameters in place of the initial set of calibration parameters.

13. The method of claim 12, wherein the standard deviation is related to a yaw error of the object.

14. The method of claim 12, wherein the standard deviation is related an optical axis alignment in X error of the object.

15. The method of claim 12, wherein the standard deviation is related to one or more parameters selected from the group of X translation parameter sensitivity of a calibration system, Y translation parameter sensitivity of a calibration system, Z translation parameter sensitivity of a calibration system, pitch angle rotation parameter sensitivity of a calibration system, yaw angle rotation parameter sensitivity of a calibration system, roll angle rotation parameter sensitivity of a calibration system, X optical center parameter sensitivity of a calibration system, and Y optical center parameter sensitivity of a calibration system.

\* \* \* \* \*